3,546,835
TUBE FORMING APPARATUS AND METHOD
George A. Mobley, Spartanburg, S.C., assignor to Milliken Industrials Corporation, White Stone, S.C., a corporation of South Carolina
Filed Feb. 20, 1969, Ser. No. 800,885
Int. Cl. B65b 9/08, 57/04
U.S. Cl. 53—28                                        9 Claims

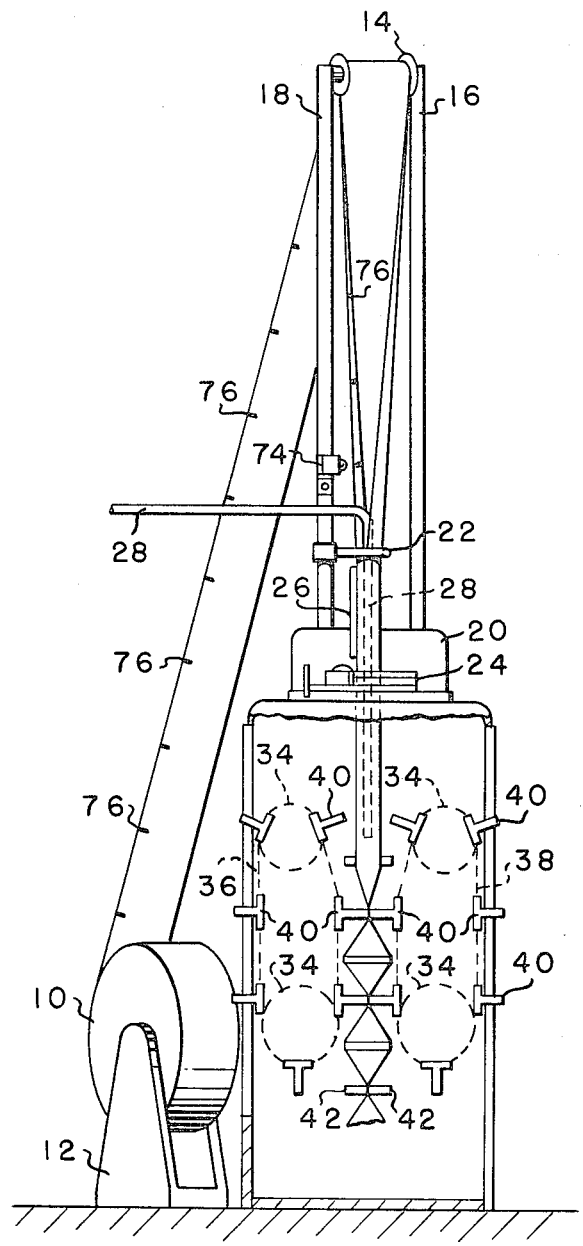
FIG. -1-

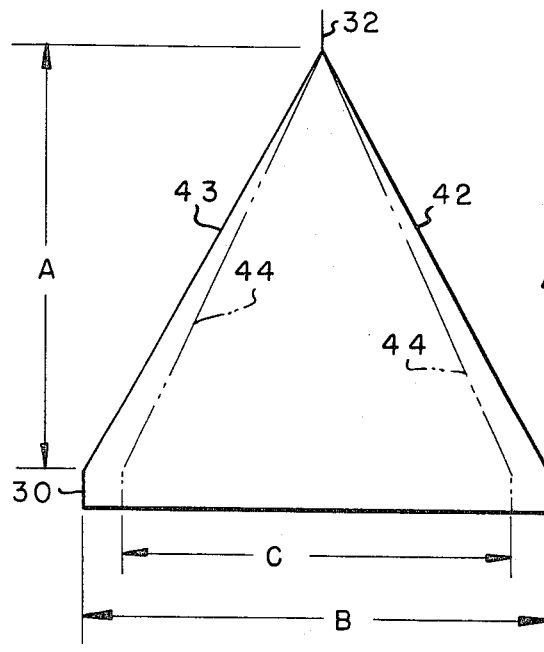
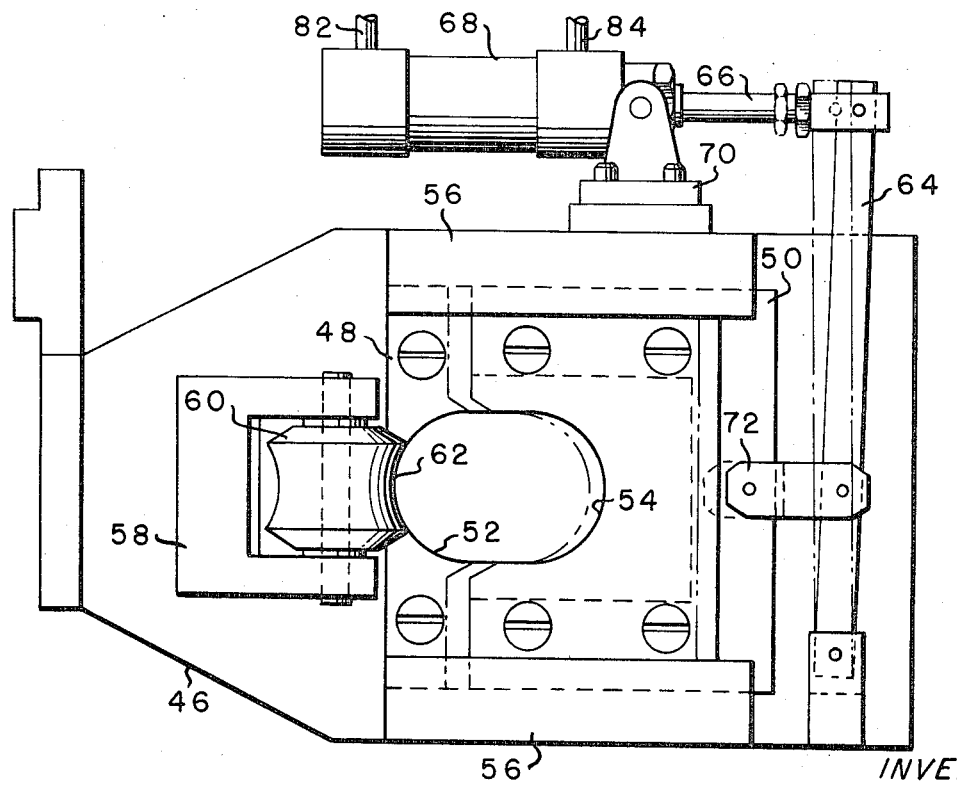

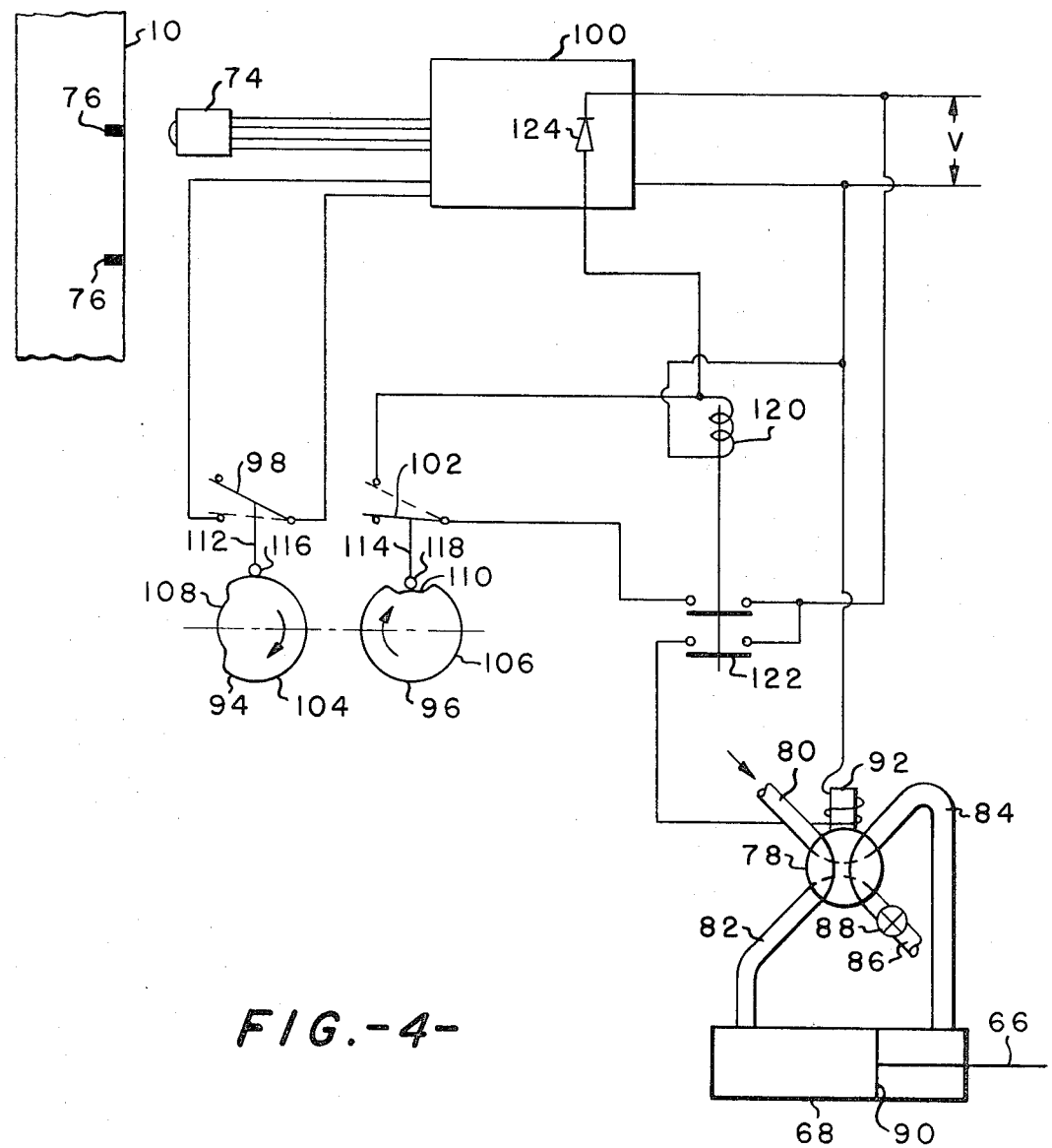
FIG.-4-

ABSTRACT OF THE DISCLOSURE

Apparatus and method to change the amount of overlap in a tubular sheet material to maintain the registration of material printed thereon when the tubular sheet of material is converted into individual tetrahedral packages.

---

This invention relates generally to packaging machines which produce tetrahedral shaped packages and in particular to machines which produce tetrahedrons by the use of a continuous uniform advancing mechanism to advance the web of material to be formed into packages.

There are several types of machines commercially available that produce tetrahedron shaped packages. One type of such machine is one that uses a reciprocating motion to advance the web of material to be made into packages. Another type of machine is one that employs a continuous uniform advancing mechanism to advance a web of packaging material. In both types of machines it is desired to control to a very close degree the position of the web material so that the information printed on the web material will be in substantially the same place on each package made in order to provide appealing and consistent packages. If the position of the web material is not controlled, it is necessary to have two repeats of the same printing for each package length of web material which results in smaller printing on each package and random spacing of the printed information. In terms of the trade the control of the position of the printed information is referred to as "registered print." In the first-mentioned tetrahedron forming machine above, registered print can be maintained by shortening or lengthening the stroke of the advancing mechanism but no successful system had been evolved to maintain registration where the advancing mechanism is uniform and continuous.

It is therefore an object of this invention to provide apparatus and method to maintain registration of the print on a machine producing tetrahedron packages which uses a continuous uniform web material advancing mechanism.

Another object of the invention is to provide a method and apparatus to produce a plurality of filled tetrahedron packages on which the printing on the outside surface of each is substantially in the same position on each tetrahedron package.

Other objects and advantages of my invention will become readily apparent as the specification proceeds to describe the invention with reference to the accompanying drawings, in which:

FIG. 1 is a schematic representation of a continuous uniform web material advancing mechanism tetrahedron forming machine;

FIG. 2 is a schematic representation of a tetrahedron package illustrating the principles of the invention;

FIG. 3 is a top view of the new and novel tube forming mechanism which provides control of the position of the printing on a completed tetrahedron package; and FIG. 4 is a schematic representation of the control circuit for the tube forming mechanism shown in FIG. 3.

As is well known in the art, filled tetrahedron containers can be formed from a web of polyethylene coated paper stock. The paper stock is fed to a packaging machine, such as that shown in FIG. 1, wherein it is first formed into tubular shape by a forming ring so that the longitudinal edges of the web material overlap one another. A filling pipe is inserted into the tubular shaped web material just above a heat sealing apparatus which seals the longitudinal seam of the tubular sheet material. Then a set of opposed heat sealing jaws are located below the forming ring and come together to flat press and seal a portion of the tubular sheet material to form a transverse seal. After the transverse seal is formed by the jaws, material to be packaged is supplied into the fill tube and into the tubular sheet material above the transverse seal. When the prescribed amount of material is supplied into the tubular material the material is advanced downwardly where a second set of opposed heat sealing jaws come together to flat press and form a second transverse seal above the material supplied to the tubular sheet material to complete the filled package. The second set of sealing jaws are 90° out of phase with the first set of sealing jaws so that the second transverse seal is preferably substantially perpendicular to the first transverse seal. Then the filled package is further advanced and severed in the center of the second transverse seal to separate the completed package from the web of tubular shaped material.

Looking now to FIG. 1, a typical tetrahedron forming machine is shown which forms tetrahedron shaped filled containers from a roll of polyethylene coated paper stock 10. The paper 10 is supported on a suitable support 12 and is delivered upwardly over a guide roll 14 supported by frame members 16 and 18 secured to the casing 20 of the machine. The paper is delivered downwardly through a V-shaped member 22 which bends the longitudinal edges of the sheet material toward one another. From the member 22 the sheet material passes through a forming ring 24 wherein the overlap of the longitudinal edges is completed so that the elongated heater 26 can seal the edges together of the overlap longitudinal seal. A fill pipe 28 is located within the tubular sheet material and extends downwardly to a point above the first transverse seal formed in the tubular sheet material to supply material to be packaged. To form the first and second transverse seals 30 and 32 (FIG. 2) two sets of endless chains are continuously and uniformly rotated by sprockets 34. One set of endless chains is represented by reference numerals 36 and 38 while the other set of chains (not shown) is located perpendicular to the first set of chains 36 and 38. As shown the heating jaws 40 on the first set of chains form the first transverse seal 30 and simultaneously advances the tubular sheet material. The heating jaws 40 are spaced two packages from one another so that the heating jaws on the second set of chains can form the second transverse seal since they are located between and 90° out of phase with the heating jaws 40. It can be seen that the heating jaws being continuously rotated will form the first transverse seal 30, allow the filling material from the fill pipe to be supplied, form the second transverse seal and supply the packages to a cutting means 42, schematically represented, wherein the transverse seals are severed in the middle to form individual packages.

As discussed previously, it has been very difficult to maintain registered print in a tetrahedron forming machine which operates continuously and has the sealing jaws fixed in relation to one another. In a tetrahedron package, as shown in FIG. 2, the vertical distance A is less than the net length of paper between the transverse seals 30 and 32 since the transverse seals are formed alternatively at right angles to each other. The net length of the paper between the transverse seals is a function of the diameter or perimeter of the tubular shaped sheet material from which it is formed. As the diameter or perimeter of the tubular shaped sheet material decreases, the net length of the paper approaches the vertical distance A and conversely, the net length of the paper increases as the diameter or perimeter of the sheet material increases. FIG. 2 illustrates this principle since it shows that when the diameter or perimeter of the tubular sheet material is large, as indicated by the length B of the transverse seal 30, a package, indicated in solid lines, is obtained which has a net wall length 43 which is longer than the net wall length 44 of the package shown in phantom lines made from a section of tubular sheet material which had a reduced diameter or perimeter indicated by the transverse seal length C. Thus, it can be seen that the net length or amount of paper in each tetrahedron package can be controlled by controlling the diameter or perimeter of the tubular sheet material from which the package is formed.

To accomplish the above function the forming ring 24 shown schematically in FIG. 1 is constructed as shown in FIG. 3 and consists basically of a base plate 46, a forming member 48 rigidly attached thereto and a slidably mounted forming member 50 which cooperates with the forming member 48 to control the amount of overlap of the longitudinal edges of the sheet material to control the diameter and perimeter thereof. It should be noted that in the preferred form of the invention the tubular shape of the sheet material is more eliptical than cylindrical and therefore the opening in the forming ring 24 is elliptical to shape the sheet material. Thusly, the opening 52 in the fixed forming member 48 is elliptical and the arcuate portion 54 in the member 50 which slides in the guide members 56 has a minor axis the same length as the minor axis of the opening 52 and the same radius of curvature. Rotatably secured in a suitable support 58 attached to the base plate 46 is an idler guide roll 60 to aid in guiding the tubular sheet material through the opening 52. The groove 62 in the guide roll 60 has a radius of curvature substantially equal to that of the end portion of the opening 52.

To vary the size of opening 52 a lever arm 64 is pivotally secured at one end to the base plate 46 and pivotally secured at the other end to the piston rod 66 of a double acting piston 68 secured to the forming ring 24 by a suitable support 70. A connecting link 72 is pivotally secured to lever arm 64 and to the sliding forming member so that pivotal movement of the lever arm 72 will move the member 50 in and out depending on the direction of movement of the lever arm.

OPERATION

For purposes of detection by a photocell 74, spaced indicia 76 are printed on the paper material 10 so that adjacent indicia are spaced from one another a distance equal to the theoretical amount of paper to produce two tetrahedrons. Looking at the control diagram, it can be seen that when four way valve 78 is not energized (full line position) air is supplied through conduit 80, valve 78 and through conduit 82 into the left hand side of air cylinder 68 to cause the lever 64 (FIG. 3) to be pushed to the full line position at the right to slide forming member 50 to the right, opening the opening in the forming ring 24 to minimize the amount of tube overlap and thereby produce large tetrahedrons. At the same time air is exhausted through conduit 84, valve 78 and conduit 86. A bleed or flow control valve 88 is provided in conduit 86 to bleed the air from the cylinder 68 to prevent sudden reversals of the piston head 90 due to actuation and deactuation of the solenoid 92 which causes a change of position of the four-way valve 78.

The control is basically controlled by two cams 94 and 96 which rotate in synchronism with the travel of the web material 10. The cam 94 pre-sets the whole detection circuit through switch 98 and allows cam 96 to control the passage of a detected signal from the amplifier 100 to the solenoid 92 by controlling the position of switch 102. Each of the cams 94 and 96 have dwell surfaces 104 and 106, respectively, and actuation surfaces 108 and 110, respectively. Connected to switches 98 and 102 are actuation members 112 and 114, respectively, which are connected to followers 116 and 118 which ride on the surface of the cams. As pointed out before, the cams 94 and 96 are synchronized with one another so the switch 98 will assume the solid line position to pre-set the control circuit so that when switch 102 assumes the solid line position a detected signal will be delivered to the solenoid valve 92 and the relay coil 120 will lock in the relay 122 to maintain the solenoid energized until switch 102 breaks contact.

Assume, for the sake of discussion, the cams 94 and 96 are in the position shown with switch 98 in the solid line position. Cam 96 has just rotated to the position where the follower 118 has dropped onto the actuation surface 110 pulling switch 102 into the solid line position, thereby de-energizing relay coil 120 which opens relay switch 122 to de-energize the solenoid coil 92. The valve 78 then assumes the solid line position so that air is supplied to the left hand side of the piston 68 through conduits 80 and 82 while air is being exhausted from the right hand side of the piston through conduits 84, 86 and valve 88. In this position the forming members tend to form larger tetrahedrons with a smaller amount of overlap of the longitudinal seam.

Then as the cams 94 and 96 continue to rotate in the clockwise direction, as indicated, follower 118 will ride up on the dwell surface 106 to cause switch 102 to assume the dotted line position and follower 116 will drop onto the actuation surface 108 and close switch 98 thereby putting the amplifier 100 in the circuit with switch 102. Then, since switch 98 is closed, the momentary relay 124 of the amplifier is in operative relationship with photocell 74 to receive a signal therefrom. If the photocell scans the indicia 76 and it is in the preselected position a signal will be sent to the relay 124 which will momentarily close to energize the relay coil 120 to pull in the relay 122 energizing the solenoid 92 to cause the valve 78 to assume the dotted line position whereby air will be supplied to the right hand side of piston 68 and exhausted from the left hand side through conduit 86. This will cause the piston rod 66 to move to the left causing lever 64 to move to the left sliding forming ring 50 to the left and causing the forming ring diameter to be reduced, thereby increasing the amount of tube overlap to reduce the effect net length of the paper in the package formed later. The solenoid 92 will stay energized until cam 96 does a complete rotation and the follower once again drops onto the actuation surface 110 to move the switch 102 to the solid line position to de-energize the relay coil 120 which drops out the relay 122 an de-energizes the solenoid 92 to once again allow the valve 78 to move to the solid line position. This results in air being supplied to the left hand side of the piston 68 and exhausted from the right hand side of the piston thereby moving the forming ring 50 outwardly to decrease the amount of tube-overlap to increase the net effective length of paper in later formed tetrahedrons. It can be seen that if the indicia is not in the preselected position that air will continue to be supplied to the left hand side of the piston 68 causing larger tetrahedrons to be produced until the photocell once again detects proper location of the indicia 76.

It can thus be seen that I have provided a method and apparatus to maintain registered print by scanning indicia printed on paper stock to control the amount of overlap of the tubular material being made into individual filled tetrahedrons.

While the method and apparatus described herein constitutes the preferred form of the invention, it will be understood that the invention is capable of modification without departing from the spirit of the invention.

That which is claimed is:

1. A method to maintain registered print on a tetrahedron forming machine having continuously moving heat sealing jaws comprising the steps of: supplying a roll of paper stock with spaced indicia thereon, forming said paper stock into a tube, detecting the position of said indicia on said paper stock and changing the perimeter of said tube if said detected indicia is in a pre-determined position.

2. The method of claim 1 wherein said changing of the perimeter of said tube includes the step of changing the amount of overlap of the longitudinal edges of said paper stock.

3. Apparatus to form filled tetrahedron containers comprising: means to supply paper stock having printed information spaced thereon to said apparatus, said paper stock having spaced indicia thereon, means to form said paper stock into tubular shape, heat sealing and filling means operably associated with said apparatus to flat press and fill said tubular shaped paper stock to form filled tetrahedrons, means to continuously and uniformly advance said tubular shaped paper stock, means to sever said filled tetrahedrons from said tubular shaped paper stock and means to maintain the printed information in substantially the same position on each container.

4. The structure of claim 3 wherein said means to maintain the registered print includes a detection means which detects the position of said indicia and actuates a means to vary the perimeter of said tubular shaped paper stock if said indicia is in a pre-determined position.

5. The structure of claim 4 wherein said tube forming means includes a forming ring, said detection means varying the diameter of said forming ring to vary the perimeter of said tubular shaped paper stock.

6. The structure of claim 5 wherein said forming ring comprises a fixed member with an opening therein and a slidable member with an opening therein and means to hold said members in overlapping relationship so that the opening in one member overlies the opening in the other member.

7. The structure of claim 6 wherein varying means includes a double acting piston operably associated with the slidable member of said forming ring and means to actuate said piston to slide said slidable member to vary the diameter of said tubular member.

8. The structure of claim 7 wherein said piston biases said slidable member to the open position and varying means moves said slidable member toward a closed position upon receipt of a signal from said detection means.

9. The structure of claim 8 wherein said detection means includes a photocell.

References Cited
UNITED STATES PATENTS

| | | | |
|---|---|---|---|
| 3,026,658 | 3/1962 | Schneider et al. | 53—28 |
| 3,221,469 | 12/1965 | Murray | 53—28 |
| 3,287,878 | 11/1966 | Mobley | 53—180X |

TRAVIS S. McGEHEE, Primary Examiner

E. F. DESMOND, Assistant Examiner

U.S. Cl. X.R.

53—51, 180; 93—82